US007162221B2

(12) United States Patent
Spitz et al.

(10) Patent No.: US 7,162,221 B2
(45) Date of Patent: Jan. 9, 2007

(54) SYSTEMS, METHODS, AND COMPUTER PROGRAM PRODUCTS FOR REGISTERING WIRELESS DEVICE USERS IN DIRECT MARKETING CAMPAIGNS

(75) Inventors: David Spitz, Raleigh, NC (US); Brian Watkins, Raleigh, NC (US); Steve Cox, Durham, NC (US); Jay Thrash, Raleigh, NC (US); Matthew Squire, Raleigh, NC (US); Dana Borger, Cary, NC (US)

(73) Assignee: InPhonic, Inc., Washington, DC (US)

( * ) Notice: Subject to any disclaimer, the term of this patent is extended or adjusted under 35 U.S.C. 154(b) by 743 days.

(21) Appl. No.: 10/017,355

(22) Filed: Dec. 14, 2001

(65) Prior Publication Data

US 2003/0114157 A1   Jun. 19, 2003

(51) Int. Cl.
*H04M 11/00* (2006.01)
*G06Q 30/00* (2006.01)
*G07G 1/14* (2006.01)

(52) U.S. Cl. ........................................ 455/406; 705/14
(58) Field of Classification Search ............ 379/114.13, 379/100.08, 93.24; 455/412.2, 414.1, 414.3; 705/14

See application file for complete search history.

(56) References Cited

U.S. PATENT DOCUMENTS

| 5,933,811 | A  | * | 8/1999  | Angles et al. | 705/14  |
|-----------|----|---|---------|---------------|---------|
| 6,882,977 | B1 | * | 4/2005  | Miller        | 705/10  |
| 2001/0018340 | A1 | * | 8/2001 | Tagi       | 455/414 |
| 2001/0032193 | A1 | * | 10/2001 | Ferber     | 705/79  |
| 2002/0065748 | A1 | * | 5/2002 | Taniguchi et al. | 705/27 |
| 2002/0077898 | A1 | * | 6/2002 | Koulouris  | 705/14  |
| 2002/0128908 | A1 | * | 9/2002 | Levin et al. | 705/14 |
| 2002/0164977 | A1 | * | 11/2002 | Link, II et al. | 455/414 |
| 2005/0149406 | A1 | * | 7/2005 | Bascobert et al. | 705/14 |

* cited by examiner

*Primary Examiner*—Binh K. Tieu
(74) *Attorney, Agent, or Firm*—Patton Boggs LLP (57) ABSTRACT

Systems, methods, and computer program products are provided that allow wireless device users to "opt-in" to a direct marketing campaign by "clicking on" a conventional advertisement displayed within a wireless device and register to receive future promotions via one or more direct marketing channels. Likewise, users can "opt-out" of future direct marketing by "clicking on" content displayed within various promotional content.

60 Claims, 6 Drawing Sheets

SYSTEMS, METHODS, AND COMPUTER PROGRAM PRODUCTS FOR REGISTERING WIRELESS DEVICE USERS IN DIRECT MARKETING CAMPAIGNS

FIELD OF THE INVENTION

The present invention relates generally to commerce and, more particularly, to promoting commerce.

BACKGROUND OF THE INVENTION

With the increasing mobility of today's society, the demand for mobile computing capabilities has also increased. Many workers and professionals are downsizing their laptop computers to smaller palm-top or hand-held devices, such as personal digital assistants (PDAs). In addition, many people now utilize wireless devices, such as cellular telephones, to access the Internet and to perform various other computing functions. Wireless devices may include, but are not limited to, personal digital assistants (PDAs), cellular telephones, pagers, and communicators. Many wireless devices also utilize the Microsoft® Windows® CE and 3Com Palm® Computing platforms. With the advent and development of wireless telecommunications systems and technologies, wireless Internet access is increasing worldwide. Wireless Internet access is conventionally obtained by users of wireless devices via Wireless Service Providers (WSPs).

On-line advertising has become an important source of revenue for many commercial entities. Web pages served from commercial Web sites often utilize advertising to promote various goods and services. On-line advertising via the internet conventionally involves the use of "banner" advertisements within Web pages. A banner advertisement conventionally is an advertisement in the form of a graphic image of a designated pixel size and byte size limit that typically runs across a Web page or is positioned in a margin or other space reserved for ads. When a user views a web page displaying a banner advertisement, the user may then try to find out more information regarding the advertisement (or the business entity providing the advertisement) by selecting the advertisement ("clicking through" on the banner ad) through the use of a mouse or other pointing device.

Figure 1:
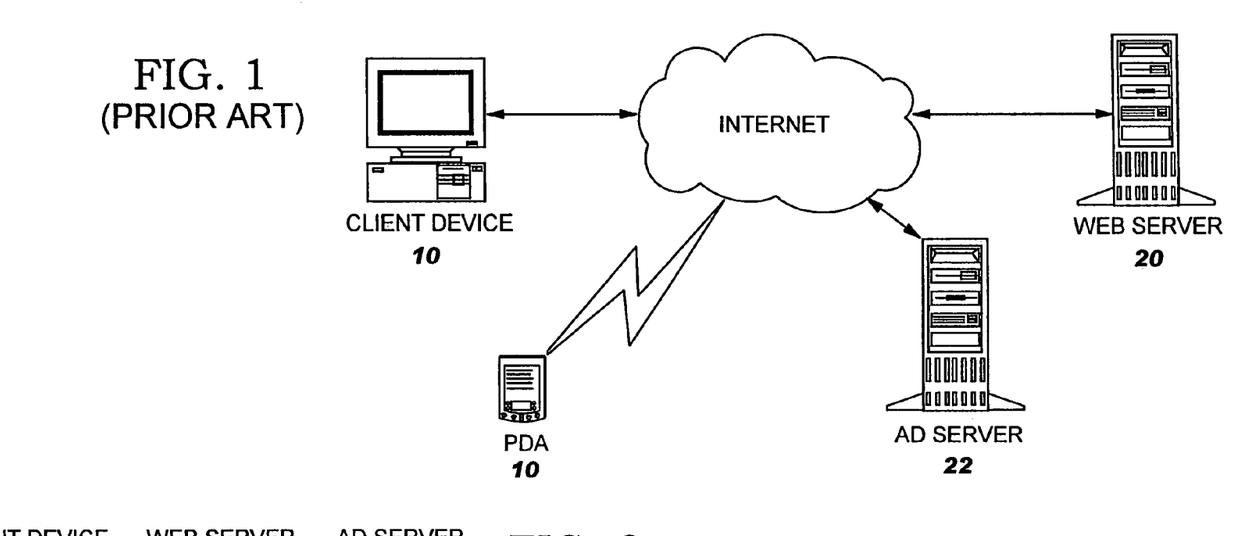
FIGS. 1 and 2 schematically illustrate conventional client-server communications associated with providing advertising within user-requested content.

Conventional advertising via the Internet is a client-server process, as illustrated in FIG. 1. Conventionally, a client (e.g., a Web browser or microbrowser executing on a client device 10) sends a request for content (e.g., a Web page) to a server executing on a server-hosting device (e.g., a Web server 20). The server returns the requested Web page to the client and directs the client to a separate ad server 22 in order to obtain an advertisement to be inserted within the Web page. Conventionally, a client receives the Web page and then waits for an advertisement to be served from a designated ad server for placement within the Web page.

Conventionally, Web servers impose restrictions on advertisements that prevent advertisements from being stored locally (i.e., "cached") by client devices. By preventing caching, advertisements are allowed to change and rotate independently of the content within which they are placed. For example, a client may make multiple requests for the same content; however, different advertisements may be placed within the content at each separate request.

Figure 2:
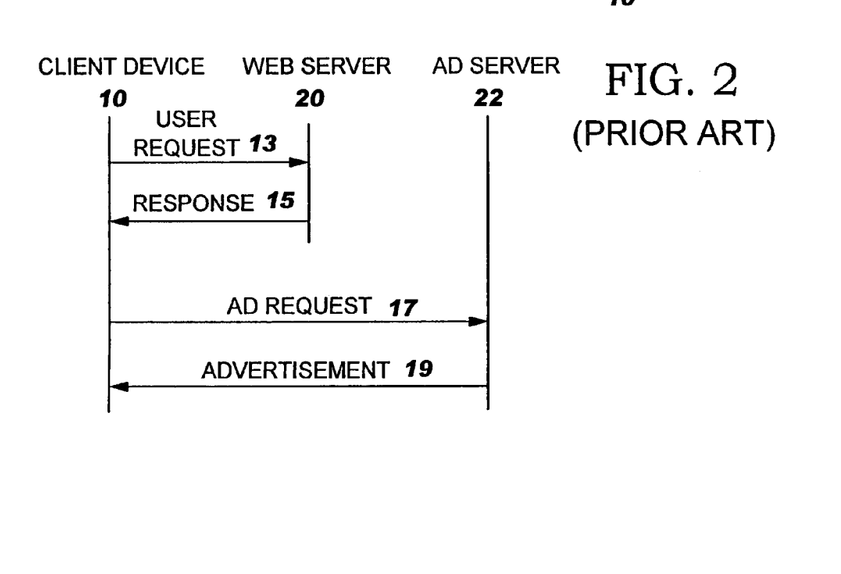

Conventionally, Web servers invoke some logic by which advertisements are selected for inclusion within user-requested content. For example, a Web server may use information about a user making a client request and/or about a user request being made to determine what advertisement to place within user-requested content. For example, as illustrated in FIG. 2, a user makes a request 13 to a Web server 20 via a client device 10 (e.g., a cellular telephone, PDA, or other type of wireless device). The Web server 20 includes logic for selecting an advertisement to be included within the requested content. A selected advertisement can be retrieved from a database and returned to the client with the content (i.e., in the response 15). Alternatively, the client can be directed to make a request 17 for an advertisement from an ad server 22. The ad server 22 serves the advertisement 19 to the client for insertion within the content provided by the Web server 20. Wireless content publishers also may provide advertisements within user-requested content, often as interstitial displays within a sequence of content displays (cards).

However, in advertising, it is considered highly desirable to target advertisements and other promotional efforts to specific consumers (often referred to as "direct marketing"), rather than to broadcast advertisements to consumers in general, such as via banner advertising. By targeting advertising to individual consumers, it is believed the likelihood is increased that a consumer will read and act upon such advertising. As such, various efforts have been made to implement direct marketing via e-mail transmitted over the Internet in order to deliver customized advertising to targeted consumers.

Unfortunately, public opinion regarding unsolicited e-mail (often referred to as "spam") may have dampened somewhat the effectiveness and success of conventional direct marketing campaigns conducted via e-mail. Moreover, successful direct marketing campaigns typically require specific information about consumers that are being targeted. Unfortunately, previous direct marketing efforts may have been somewhat unsuccessful in obtaining information sufficient to conduct effective direct marketing campaigns, particularly to users of wireless devices. As the use of handheld computing/communications devices increases (e.g., PDAs, pagers, cellular telephones, web-enabled radiotelephones, and/or other mobile/wireless devices), commercial entities are continuously looking for new ways to enhance revenue via the delivery of advertising and other information to users of these handheld devices.

SUMMARY OF THE INVENTION

In view of the above discussion, embodiments of the present invention can provide systems, methods, and computer program products for allowing wireless device users to "opt-in" to a direct marketing campaign by "clicking on" a conventional advertisement displayed within a wireless device and register to receive future promotions via one or more direct marketing channels. Likewise, users can "opt-out" of future direct marketing by "clicking on" displayed content.

According to embodiments of the present invention, systems, methods, and computer program products for conducting direct marketing campaigns to users of wireless devices are provided. Content is provided within a display of a wireless device and includes a portion that is responsive to user activation and that displays an identification of a direct marketing campaign. In response to user activation of the content portion, the user is registered to receive one or more communications from an identified direct marketing campaign. Also, in response to user activation of the content portion, user identification information and direct marketing campaign identification information are obtained. The user identification includes a communication address (e.g., e-mail address, telephone number, etc.) where the user can receive communications from the direct marketing campaign via the wireless device. The user is then registered in the identified direct marketing campaign in response to obtaining user identification information. One or more communications are subsequently sent from the direct marketing campaign to the user at the communication address.

According to embodiments of the present invention, a user may opt-out from a direct marketing campaign by clicking on a link within a communication that allows the user to unregister from the direct marketing campaign.

Embodiments of the present invention can be advantageous because advertisers can integrate conventional pull advertising (e.g., banner advertising) with direct advertising (e.g., push advertising) for direct marketing campaigns for wireless device users.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout the description of the drawings.

As will be appreciated by one of skill in the art, the present invention may be embodied as methods, data processing systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in object oriented programming languages (e.g., JAVA®, Smalltalk or C++) and/or may also be written in conventional procedural programming languages (e.g., "C"). However, embodiments of the present invention do not depend on implementation with a particular programming language. Program code for carrying out aspects of the present invention may execute entirely on a single data processing system, or it may execute partly on one data processing system and partly on one or more other data processing systems (e.g., a proxy server at an intermediate point in a communications network).

The present invention is described below with reference to block diagram and/or flowchart illustrations of methods, apparatus (systems) and computer program products according to an embodiment of the invention. It is understood that each block of the block diagram and/or flowchart illustrations, and combinations of blocks in the block diagram and/or flowchart illustrations, can be implemented by computer program instructions. These computer program instructions may be provided to a processor of a general purpose computer, special purpose computer, or other programmable data processing apparatus (e.g., personal computer, portable computer, handheld computer, PDA, pager, cellular telephone, Web-enabled radiotelephone, other mobile/wireless device) to produce a machine, such that the instructions, which execute via the processor of the computer or other programmable data processing apparatus, create means for implementing the functions specified in the block diagram and/or flowchart block or blocks.

These computer program instructions may also be stored in a computer-readable memory that can direct a computer or other programmable data processing apparatus (e.g., personal computer, portable computer, handheld computer, PDA, pager, cellular telephone, Web-enabled radiotelephone, other mobile/wireless device) to function in a particular manner, such that the instructions stored in the computer-readable memory produce an article of manufacture including instructions which implement the function(s) specified in the block diagram and/or flowchart block or blocks.

The computer program instructions may also be loaded onto a computer or other programmable data processing apparatus (e.g., personal computer, portable computer, handheld computer, PDA, pager, cellular telephone, Web-enabled radiotelephone, other mobile/wireless device) to cause a series of operational steps to be performed on the computer or other programmable apparatus to produce a computer implemented process such that the instructions which execute on the computer or other programmable apparatus provide steps for implementing the functions specified in the block diagram and/or flowchart block or blocks.

It should be noted that, in some embodiments of the present invention, the functions noted in the blocks may occur out of the order noted in the figures. For example, two blocks shown in succession may in fact be executed substantially concurrently or the blocks may sometimes be executed in reverse order, depending on the functionality involved. Furthermore, in certain embodiments of the present invention, such as object oriented programming embodiments, the sequential nature of the flowcharts may be replaced with an object model such that operations and/or functions may be performed in parallel or sequentially.

The Internet

As known to those of skill in the art, the Internet is a worldwide decentralized network of computers having the ability to communicate with each other. The World-Wide Web (Web) is comprised of server-hosting computers (Web servers) connected to the Internet that are configured to serve hypertext documents (Web pages) and/or other types of files to requesting clients (e.g., Web browsers) utilizing the Hypertext Transfer Protocol (HTTP) via a Transmission Control Protocol/Internet Protocol (TCP/IP) connection between a client-hosting device and a server-hosting device.

A Web site is conventionally a related collection of Web files that includes a beginning file called a "home" page. From the home page, a visitor can access other files and applications at a Web site. A large Web site may utilize a number of servers, which may or may not be different and which may or may not be geographically-dispersed. For example, the Web site of the International Business Machines Corporation (www.ibm.com) consists of thousands of Web pages and files spread out over multiple Web servers in locations world-wide.

A Web server (also referred to as an HTTP server) is a computer program that utilizes HTTP to serve files that form Web pages to requesting Web clients. Exemplary Web servers are International Business Machines Corporation's family of Lotus Domino® servers and the Apache server (available from www.apache.org). A Web client is a requesting program that also utilizes HTTP. A browser is an exemplary Web client for use in requesting Web pages and files from Web servers. A Web server waits for a Web client, such as a browser, to open a connection and to request a Web page. The Web server then sends a copy of the requested Web page to the Web client, closes the connection with the Web client, and waits for the next connection.

To ensure that browsers and Web servers can interoperate unambiguously, HTTP defines the exact format of requests (HTTP requests) sent from a browser to a Web server as well as the format of responses (HTTP responses) that a Web server returns to a browser. Exemplary browsers that can be utilized with embodiments of the present invention include, but are not limited to, Handspring Blazer (Handspring, Inc., Mountain View, Calif.), OpenWave Mobile Browser (OpenWave Systems, Inc., Redwood City, Calif.), Bitstream ThunderHawk (Bitstream, Inc. Cambridge, Mass.), as well as browsers such as Netscape Navigator® (America Online, Inc., Dulles, Va.) and Internet Explorer™ (Microsoft Corporation, Redmond, Wash.). Browsers typically provide a graphical user interface and/or a text-based user interface for retrieving and viewing Web pages, applications, and other resources served by Web servers.

As is known to those skilled in this art, a Web page is conventionally formatted via page description languages such as HTML, WML (Wireless Markup Language), HDML (Handheld Device Markup Language), which typically contain text and can reference graphics, sound, animation, and video data. Page description languages provide for basic document formatting and allow a Web content provider to specify anchors or hypertext links (typically manifested as highlighted text) to other servers. When a user selects a particular hypertext link, a browser running on the user's client device reads and interprets an address, called a Uniform Resource Locator (URL) associated with the link, connects the browser with a Web server at that address, and makes a request (e.g., an HTTP request) for the file identified in the link. The Web server then sends the requested file to the client device which the browser interprets and renders within a display screen.

As is understood by those of skill in the art, Wireless Application Protocol (WAP) is a standard for displaying content within small display screens of communications devices such as Personal Digital Assistants (PDAs), pagers, cellular telephones, and the like. WAP uses WML (as well as HDML), both of which are similar to HTML, but which do not require a device to have a keyboard or mouse.

Content in WML and HDML format may be organized into a collection of "cards" and "decks", wherein each deck has one or more cards in its structure. Every card in a deck has an individual name. WML and HDML include support for explicitly managing navigation between cards and decks.

Opt-In/Opt-Out Direct Marketing Via Wireless Devices

Figure 3:
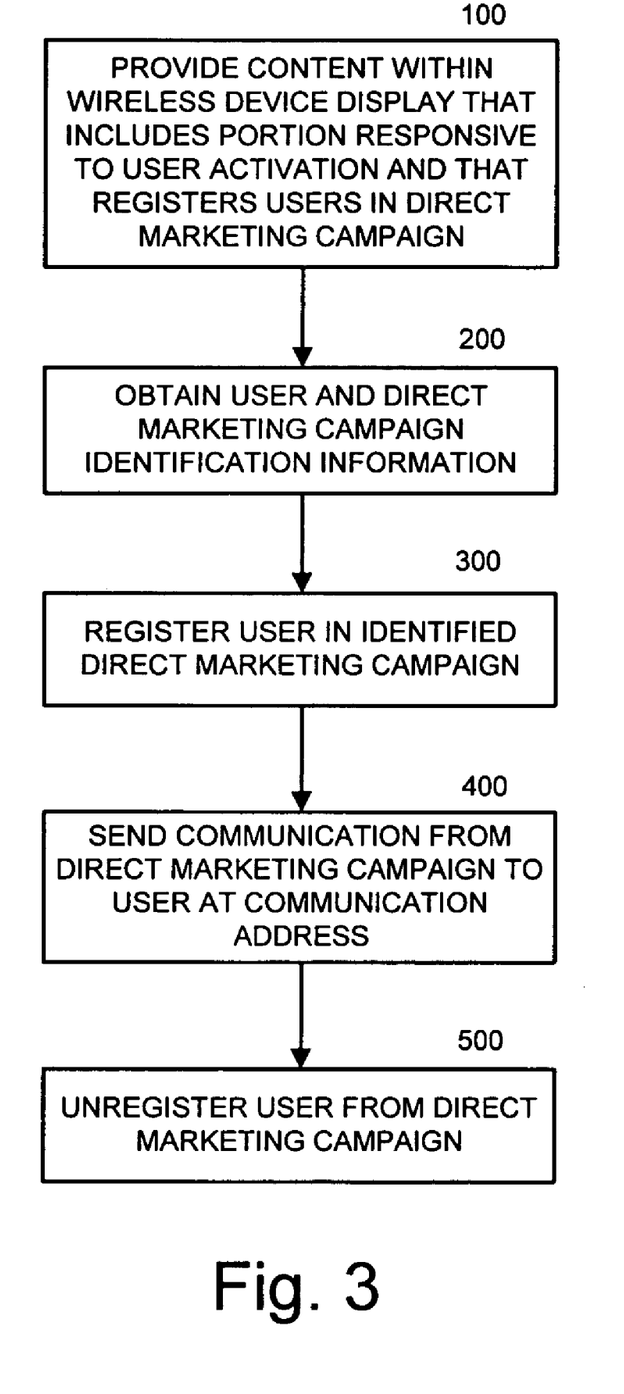
FIG. 3 illustrates systems, methods, and computer program products for registering wireless device users in a direct marketing campaign, according to embodiments of the present invention.

Referring to FIG. 3, systems, methods, and computer program products for registering wireless device users in a direct marketing campaign, according to embodiments of the present invention, are illustrated. As used herein, the term "wireless device" includes, but is not limited to, personal digital assistants (PDAs), appliances, wireless communication devices (such as cellular telephones), etc.

Content is provided within a display of a user's wireless device and includes a portion (e.g., text, graphic, button, etc.) that identifies a direct marketing campaign that the user can register with (referred to as "opting in") (Block 100). The content portion is responsive to user activation and displays an identification of a particular direct marketing campaign. In response to user activation of the content portion, the user is registered with the identified direct marketing campaign to receive one or more subsequent communications from the direct marketing campaign.

An identification of the user and of the particular direct marketing campaign is obtained in response to user activation of the content portion (Block 200). The user identification includes a communication address where the user can receive communications from the direct marketing campaign via a wireless device. Exemplary communication addresses include a user's email address and telephone number. Additional information that may be obtained includes subscriber identification.

According to embodiments of the present invention, obtaining user identification information may include extracting user identification information from an HTTP header associated with a user HTTP request that is generated in response to user activation of the content portion. According to other embodiments of the present invention, an interactive form associated with the content portion may be displayed within the wireless device display. User identification information provided by the user can then be retrieved via the form. According to other embodiments of the present invention, user identification information can be obtained by parsing information included within a click-through URL associated with the content portion.

Once the user and the particular direct marketing campaign are identified, the user is registered in the direct marketing campaign (Block 300). One or more subsequent communications are then sent directly to the user (Block 400). For example, e-mail communications may be sent directly to the user. Alternatively, telephonic communications may be sent to the user. According to embodiments of the present invention, subsequent communications from a direct marketing campaign can allow a user to "unregister"

such that no further communications from the direct marketing campaign are transmitted to the user (Block 500).

Conventionally, when a user activates a link (e.g., "clicks on" a banner advertisement, etc.), the user activation results in an HTTP request to an ad server. The ad server records the activation (i.e., "click") and redirects the user to a site specified by the advertiser. To perform dynamic registration or "un-registration" for direct marketing campaigns according to embodiments of the present invention, a click-through URL for advertisements may be enhanced with several additional parameters. Extra information is then pulled from the URL and the HTTP headers so that the user can be identified and so that a particular direct marketing campaign can be identified. This information is stored by the ad server and made available for the direct marketing campaign.

Exemplary ad server technologies which may be utilized in accordance with embodiments of the present invention are described in U.S. patent application Ser. Nos.: 09/799,194; 09/860,401; 09/905,799; and 09/922,348, which are assigned to the assignee of the present application and the disclosures of which are incorporated herein by reference in their entireties.

Figure 4:
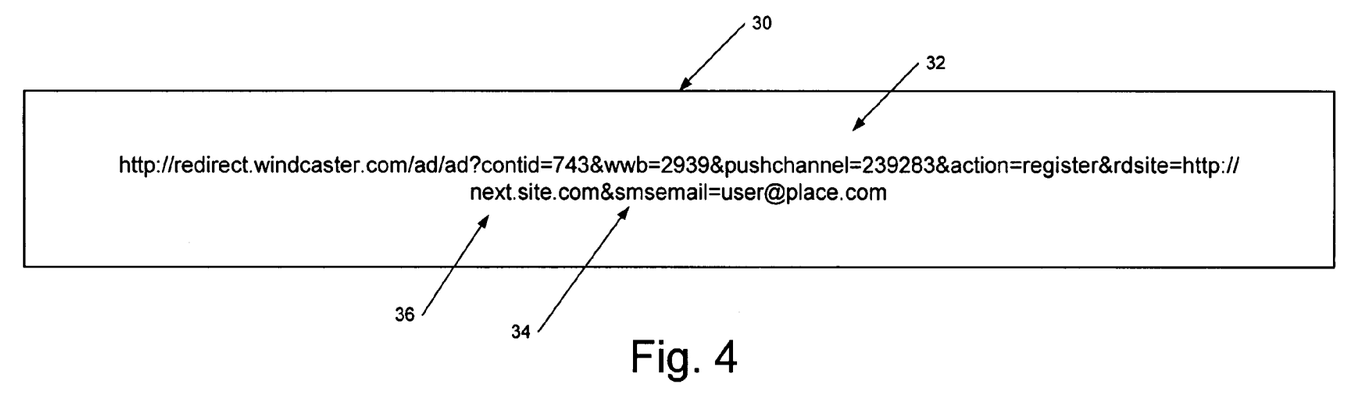
FIG. 4 illustrates an exemplary clickthrough URL that an advertiser can use to integrate a promotional registration into a banner advertisement displayed within a user's wireless device according to embodiments of the present invention.

FIG. 4 illustrates an exemplary clickthrough URL 30 that an advertiser can use to integrate a direct marketing (or other promotional) campaign registration into a banner advertisement displayed within a user's wireless device. The extra parameters on the illustrated clickthrough URL 30 indicate that a user, upon activation of the URL 30, has decided to register for a direct marketing campaign. The particular direct marketing campaign is identified by the "pushchannel" parameter 32. When receiving the clickthrough URL 30, embodiments of the present invention extract the piece of data that identifies the type of communication to be sent to the user via the direct marketing campaign (e.g., smsemail 34 in the illustrated embodiment). This information is stored in an ad serving system before redirecting the user to their ultimate destination indicated by the URL, which is "next.site.com" 36 in the illustrated embodiment. In the illustrated embodiment, an interactive form may be used to retrieve the user's communication address (e.g., the user's e-mail address).

According to embodiments of the present invention, such as embodiments implemented via WAP technology, the identifying user information can be extracted from an HTTP header rather than being included in a URL. As such an advertiser conducting a direct marketing campaign does not have to do any work to gather user information, since it can be included automatically in the user HTTP request to the ad serving system.

As is known to those of skill in the art, HTTP headers communicate information that Web servers and browsers use to define the type of data that is being exchanged therebetween. An HTTP header accompanies HTTP requests to a Web server and typically provides information about a requesting client device and browser. Exemplary information provided within an HTTP header may include the size of a client device display, whether a client device display is a color display or a monochromatic display, an identification of the client device browser, and an identification of the client device operating system. Thus, an identification of a wireless device and/or Web browser executing on the wireless device may sufficiently identify the user of the wireless device.

Figure 5:
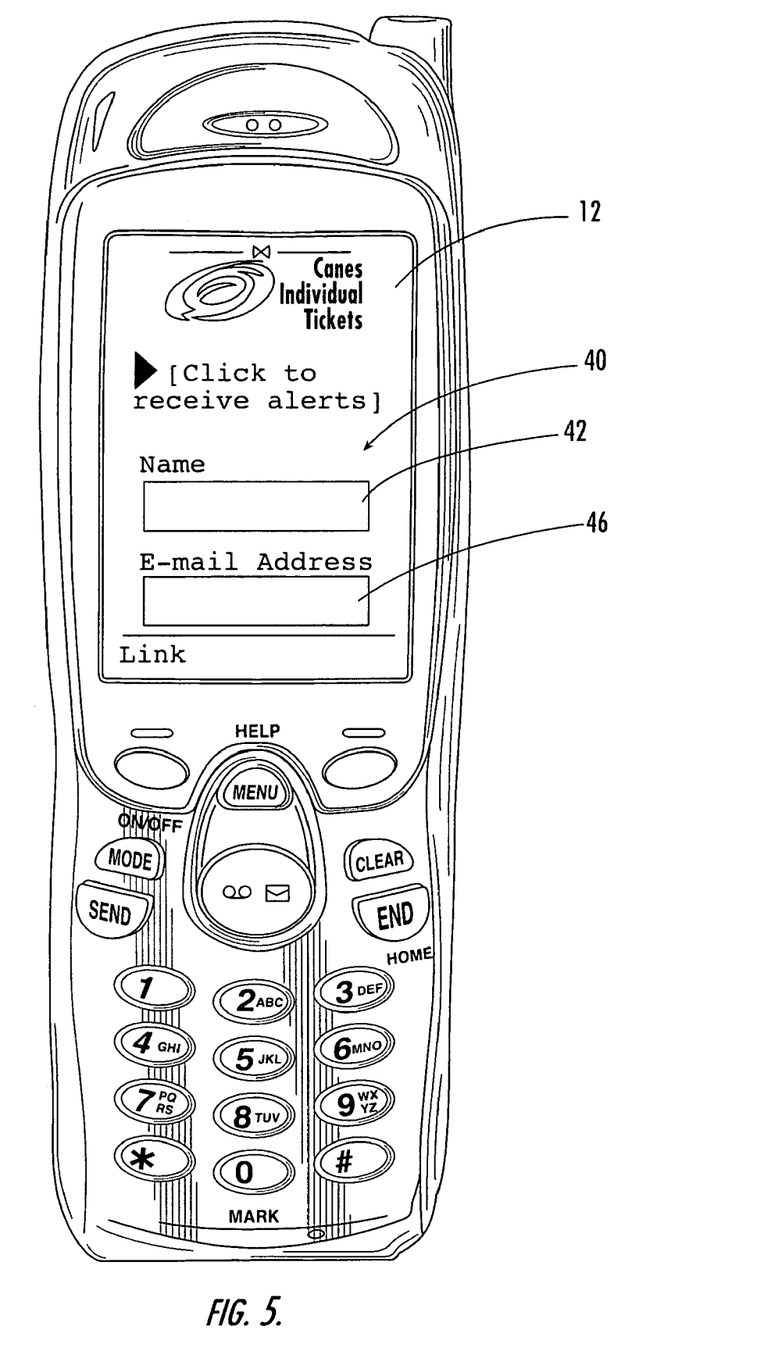
FIG. 5 illustrates an exemplary interactive form displayed within a wireless device display according to embodiments of the present invention.
Figure 6:
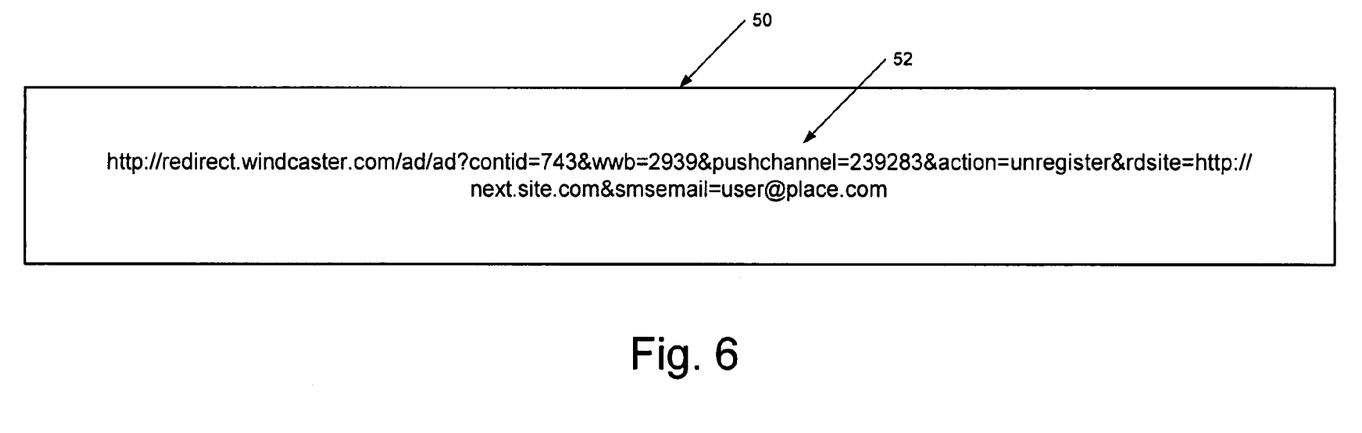
FIG. 6 illustrates an exemplary "opt out" URL that can be associated with displayed content, or a portion of displayed content, according to embodiments of the present invention.

An exemplary interactive form 40 displayed within a wireless device display 12 is illustrated in FIG. 5. The illustrated form 40 includes fields for a user's name 42 and a user's e-mail address 46. Upon activating a "Send" button (e.g., either in the display 12 or on the keypad, etc.) the information contained within the form 40 is submitted to the particular direct marketing campaign. Interactive forms displayed within Web browsers are well known and understood to those of skill in the art, and need not be described herein According to embodiments of the present invention, a user can "opt-out" of a direct marketing campaign by "clicking on" content displayed with a communication from an advertiser. For example, when an advertiser uploads an advertisement intended for a direct marketing channel, the ad server includes an "opt-out" option on the advertisement that can be activated (i.e., "clicked on") by the user. FIG. 6 illustrates an exemplary "opt out" URL 50 that can be associated with displayed content, or a portion of displayed content. The extra parameters on the illustrated clickthrough URL 50 indicate that a user, upon activation of the URL 50, has decided to "unregister" from the direct marketing campaign (i.e., to elect not to receive any more communications associated with the identified campaign). The particular direct marketing campaign is identified by the "pushchannel" parameter 52.

Figure 7:
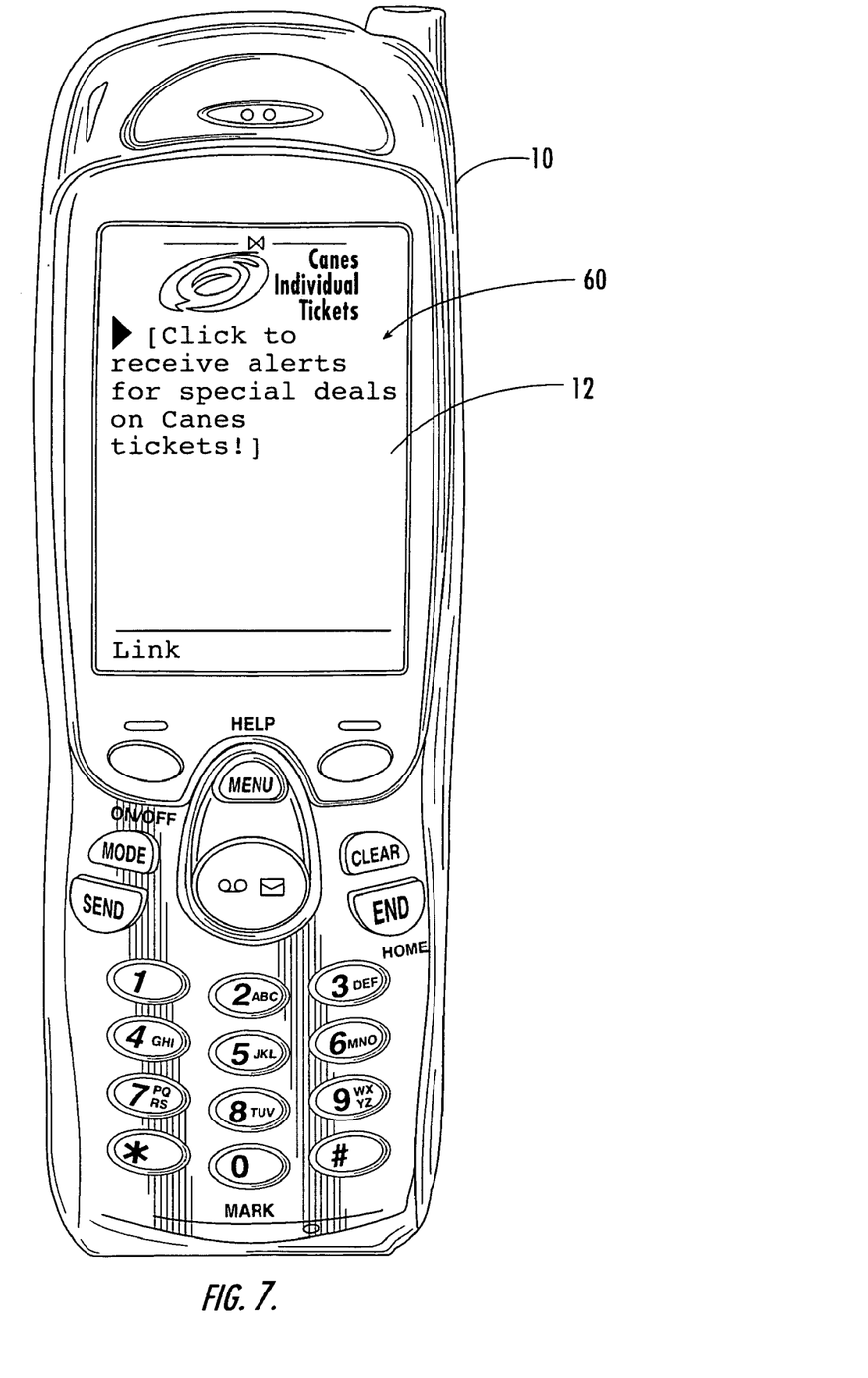
FIGS. 7 and 8 illustrate wireless devices having exemplary "opt in" and "opt out" capabilities according to embodiments of the present invention.
Figure 8:
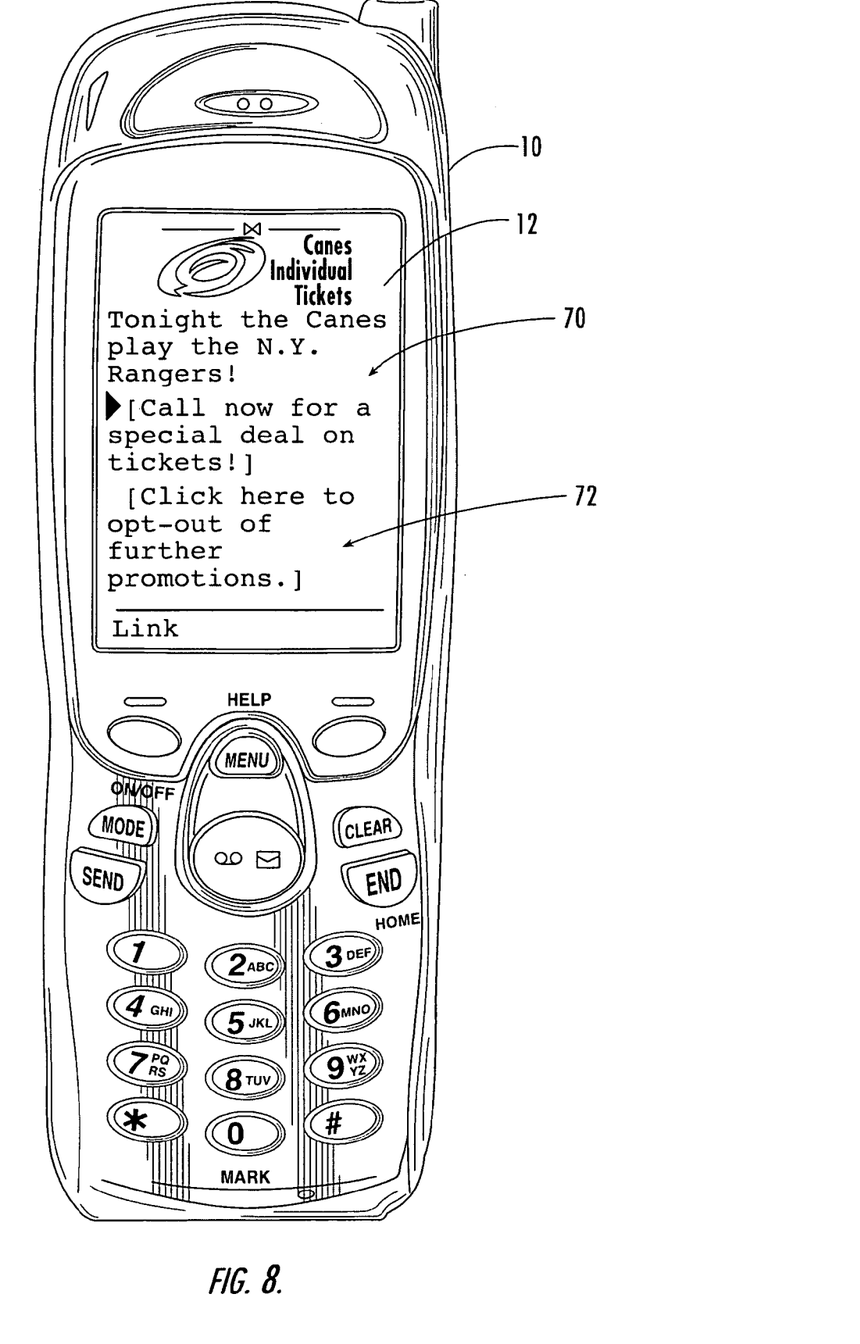

FIGS. 7 and 8 illustrate wireless devices 10 having exemplary "opt in" and "opt out" capabilities according to embodiments of the present invention. In FIG. 7, a conventional "pull" advertisement 60 is displayed within the wireless device display 12. The user may click on the ad 60 to dynamically register for promotions, in this case Carolina Hurricanes ice hockey tickets. In FIG. 8, a direct marketing communication 70 displayed within the display 12 includes a link 72 that allows a user to "opt out" of future communications associated with a particular direct marketing campaign.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of registering wireless device users in a direct marketing campaign, comprising: providing content within a display of a wireless device, wherein the content includes a portion that is responsive to user activation and that displays an identification of a direct marketing campaign, and wherein the content portion, responsive to user activation, is configured to register a user to receive one or more communications from the direct marketing campaign; obtaining user identification information and direct marketing campaign identification information in response to user activation of the content portion, wherein the user identification includes a communication address where the user can receive communications from the direct marketing campaign via the wireless device; and registering the user in the identified direct marketing campaign in response to obtaining user identification information.

2. The method of claim 1, wherein obtaining user identification information comprises extracting user identification information from an HTTP header associated with a user request generated in response to user activation of the content portion.

3. The method of claim 1, wherein an interactive form associated with the content portion is displayed within the wireless device display, and wherein obtaining user identification information comprises retrieving information provided by the user in the interactive form.

4. The method of claim 1, wherein obtaining user identification information comprises parsing information within a clickthrough URL associated with the content portion.

5. The method of claim 1, wherein obtaining direct marketing campaign identification information comprises parsing information within a clickthrough URL associated with the content portion.

6. The method of claim 1, wherein the communication address comprises an email address.

7. The method of claim 1, wherein the communication address comprises a telephone number.

8. The method of claim 1, wherein the content portion comprises an advertisement.

9. A direct marketing method for users of wireless devices, comprising: providing content within a display of a wireless device, wherein the content includes a portion that is responsive to user activation and that displays an identification of a direct marketing campaign, and wherein the content portion, responsive to user activation, is configured to register a user to receive one or more communications from the direct marketing campaign; obtaining user identification information and direct marketing campaign identification information in response to user activation of the content portion, wherein the user identification includes a communication address where the user can receive communications from the direct marketing campaign via the wireless device; registering the user in the identified direct marketing campaign in response to obtaining user identification information; and sending a communication from the direct marketing campaign to the user at the communication address.

10. The method of claim 9, wherein the communication includes a portion that is responsive to user activation and that identifies the direct marketing campaign, wherein the communication portion is configured to unregister the user from the direct marketing campaign in response to user activation of the communication portion, and wherein the method further comprises: obtaining user identification information and direct marketing campaign identification information in response to user activation of the communication portion; and unregistering the user from the direct marketing campaign in response to obtaining user identification information and direct marketing campaign identification information.

11. The method of claim 9, wherein obtaining user identification information comprises extracting user identification information from an HTTP header associated with a user request generated as a result of user activation of the content portion.

12. The method of claim 10, wherein obtaining user identification information comprises extracting user identification information from an HTTP header associated with a user request generated as a result of user activation of the communication portion.

13. The method of claim 9, wherein an interactive form associated with the content portion is displayed within the wireless device display, and wherein obtaining user identification information comprises retrieving information provided by the user in the interactive form.

14. The method of claim 10, wherein an interactive form associated with the communication portion is displayed within the wireless device display, and wherein obtaining user identification information comprises retrieving information provided by the user in the interactive form.

15. The method of claim 9, wherein obtaining direct marketing campaign identification information comprises parsing information within a clickthrough URL associated with the content portion.

16. The method of claim 10, wherein obtaining direct marketing campaign identification information comprises parsing information within a clickthrough URL associated with the communication portion.

17. The method of claim 9, wherein the communication address includes a user email address.

18. The method of claim 9, wherein the communication address includes a user telephone number.

19. The method of claim 9, wherein the content portion comprises an advertisement.

20. The method of claim 10, wherein the communication portion comprises an advertisement.

21. A computer program product that registers wireless device users in direct marketing campaigns, the computer program product comprising a computer usable storage medium having computer readable program code embodied in the medium, the computer readable program code comprising: computer readable program code that provides content within a display of a wireless device, wherein the content includes a portion that is responsive to user activation and that displays an identification of a direct marketing campaign, and wherein the content portion, responsive to user activation, is configured to register a user to receive one or more communications from the direct marketing campaign; computer readable program code that obtains user identification information and direct marketing campaign identification information in response to user activation of the content portion, wherein the user identification includes a communication address where the user can receive communications from the direct marketing campaign via the wireless device; and computer readable program code that registers the user in the identified direct marketing campaign in response to obtaining user identification information.

22. The computer program product of claim 21, wherein computer readable program code that obtains user identification information comprises computer readable program code that extracts user identification information from an HTTP header associated with a user request generated in response to user activation of the content portion.

23. The computer program product of claim 21, wherein an interactive form associated with the content portion is displayed within the wireless device display, and wherein computer readable program code that obtains user identification information comprises computer readable program code that retrieves information provided by the user in the interactive form.

24. The computer program product of claim 21, wherein computer readable program code that obtains user identification information comprises computer readable program code that parses information within a clickthrough URL associated with the content portion.

25. The computer program product of claim 21, wherein computer readable program code that obtains direct marketing campaign identification information comprises computer readable program code that parses information within a clickthrough URL associated with the content portion.

26. The computer program product of claim 21, wherein the communication address comprises an email address.

27. The computer program product of claim 21, wherein the communication address comprises a telephone number.

28. The computer program product of claim 21, wherein the content portion comprises an advertisement.

29. A direct marketing computer program product for users of wireless devices, the computer program product comprising a computer usable storage medium having computer readable program code embodied in the medium, the computer readable program code comprising: computer readable program code that provides content within a display of a wireless device, wherein the content includes a portion that is responsive to user activation and that displays an identification of a direct marketing campaign, and wherein the content portion, responsive to user activation, is configured to register a user to receive one or more communications from the direct marketing campaign; computer readable program code that obtains user identification information and direct marketing campaign identification information in response to user activation of the content portion, wherein the user identification includes a communication address where the user can receive communications from the direct marketing campaign via the wireless device; computer readable program code that registers the user in the identified direct marketing campaign in response to obtaining user identification information; and computer readable program code that sends a communication from the direct marketing campaign to the user at the communication address.

30. The computer program product of claim 29, wherein the communication includes a portion that is responsive to user activation and that identifies the direct marketing campaign, wherein the communication portion is configured to unregister the user from the direct marketing campaign in response to user activation of the communication portion, and wherein the computer program product further comprises: computer readable program code that obtains user identification information and direct marketing campaign identification information in response to user activation of the communication portion; and computer readable program code that unregisters the user from the direct marketing campaign in response to obtaining user identification information and direct marketing campaign identification information.

31. The computer program product of claim 29, wherein computer readable program code that obtains user identification information comprises computer readable program code that extracts user identification information from an HTTP header associated with a user request generated as a result of user activation of the content portion.

32. The computer program product of claim 30, wherein computer readable program code that obtains user identification information comprises computer readable program code that extracts user identification information from an HTTP header associated with a user request generated as a result of user activation of the communication portion.

33. The computer program product of claim 29, wherein an interactive form associated with the content portion is displayed within the wireless device display, and wherein computer readable program code that obtains user identification information comprises computer readable program code that retrieves information provided by the user in the interactive form.

34. The computer program product of claim 30, wherein an interactive form associated with the communication portion is displayed within the wireless device display, and wherein computer readable program code that obtains user identification information comprises computer readable program code that retrieves information provided by the user in the interactive form.

35. The computer program product of claim 29, wherein computer readable program code that obtains direct marketing campaign identification information comprises computer readable program code that parses information within a clickthrough URL associated with the content portion.

36. The computer program product of claim 30, wherein computer readable program code that obtains direct marketing campaign identification information comprises computer readable program code that parses information within a clickthrough URL associated with the communication portion.

37. The computer program product of claim 29, wherein the communication address includes a user email address.

38. The computer program product of claim 29, wherein the communication address includes a user telephone number.

39. The computer program product of claim 29, wherein the content portion comprises an advertisement.

40. The computer program product of claim 30, wherein the communication portion comprises an advertisement.

41. A system that registers wireless device users in direct marketing campaigns, comprising: means for providing content within a display of a wireless device, wherein the content includes a portion that is responsive to user activation and that displays an identification of a direct marketing campaign, and wherein the content portion, responsive to user activation, is configured to register a user to receive one or more communications from the direct marketing campaign; means for obtaining user identification information and direct marketing campaign identification information in response to user activation of the content portion, wherein the user identification includes a communication address where the user can receive communications from the direct marketing campaign via the wireless device; and means for registering the user in the identified direct marketing campaign in response to obtaining user identification information.

42. The system of claim 41, wherein means for obtaining user identification information comprises means for extracting user identification information from an HTTP header associated with a user request generated in response to user activation of the content portion.

43. The system of claim 41, wherein an interactive form associated with the content portion is displayed within the wireless device display, and wherein means for obtaining user identification information comprises means for retrieving information provided by the user in the interactive form.

44. The system of claim 41, wherein means for obtaining user identification information comprises means for parsing information within a clickthrough URL associated with the content portion.

45. The system of claim 41, wherein means for obtaining direct marketing campaign identification information comprises means for parsing information within a clickthrough URL associated with the content portion.

46. The system of claim 41, wherein the communication address comprises an email address.

47. The system of claim 41, wherein the communication address comprises a telephone number.

48. The system of claim 41, wherein the content portion comprises an advertisement.

49. A direct marketing system for users of wireless devices, comprising: means for providing content within a display of a wireless device, wherein the content includes a portion that is responsive to user activation and that displays an identification of a direct marketing campaign, and wherein the content portion, responsive to user activation, is configured to register a user to receive one or more communications from the direct marketing campaign; means for obtaining user identification information and direct marketing campaign identification information in response to user activation of the content portion, wherein the user identification includes a communication address where the user can receive communications from the direct marketing campaign via the wireless device; means for registering the user in the identified direct marketing campaign in response to obtaining user identification information; and means for sending a communication from the direct marketing campaign to the user at the communication address.

50. The direct marketing system of claim 49, wherein the communication includes a portion that is responsive to user activation and that identifies the direct marketing campaign, wherein the communication portion is configured to unregister the user from the direct marketing campaign in response to user activation of the communication portion, and wherein the direct marketing system further comprises: means for obtaining user identification information and direct marketing campaign identification information in response to user activation of the communication portion; and means for unregistering the user from the direct marketing campaign in response to obtaining user identification information and direct marketing campaign identification information.

51. The direct marketing system of claim 49, wherein means for obtaining user identification information comprises means for extracting user identification information from an HTTP header associated with a user request generated as a result of user activation of the content portion.

52. The direct marketing system of claim 49, wherein means for obtaining user identification information comprises means for extracting user identification information from an HTTP header associated with a user request generated as a result of user activation of the communication portion.

53. The direct marketing system of claim 49, wherein an interactive form associated with the content portion is displayed within the wireless device display, and wherein means for obtaining user identification information comprises means for retrieving information provided by the user in the interactive form.

54. The direct marketing system of claim 50, wherein an interactive form associated with the communication portion is displayed within the wireless device display, and wherein means for obtaining user identification information comprises means for retrieving information provided by the user in the interactive form.

55. The direct marketing system of claim 49, wherein means for obtaining direct marketing campaign identification information comprises means for parsing information within a clickthrough URL associated with the content portion.

56. The direct marketing system of claim 50, wherein means for obtaining direct marketing campaign identification information comprises means for parsing information within a clickthrough URL associated with the communication portion.

57. The direct marketing system of claim 49, wherein the communication address includes a user email address.

58. The direct marketing system of claim 49, wherein the communication address includes a user telephone number.

59. The direct marketing system of claim 49, wherein the content portion comprises an advertisement.

60. The direct marketing system of claim 50, wherein the communication portion comprises an advertisement.

\* \* \* \* \*